United States Patent [19]

Hay

[11] Patent Number: 5,246,676
[45] Date of Patent: Sep. 21, 1993

[54] METHOD OF PRODUCING OXYGEN BY ADSORPTION

[75] Inventor: Léon Hay, Paris, France

[73] Assignee: L'Air Liquide, Societe Anonyme Pour L'Etude et L'Exploitation des Procedes Georges Claude, Paris, France

[21] Appl. No.: 834,690

[22] Filed: Feb. 11, 1992

[30] Foreign Application Priority Data

Feb. 20, 1991 [FR] France .................. 91 02009

[51] Int. Cl.$^5$ .................. C01B 13/00; B01D 51/00; B01D 53/00
[52] U.S. Cl. .................. 423/219; 95/98
[58] Field of Search .................. 423/219; 55/26

[56] References Cited

U.S. PATENT DOCUMENTS 4,969,935 11/1990 Hay .................. 55/26
4,981,499 1/1991 Hay et al. .................. 55/26

FOREIGN PATENT DOCUMENTS 0248720 12/1987 European Pat. Off. .
0350373 1/1990 European Pat. Off. .
2155805A 10/1985 United Kingdom .

Primary Examiner—Gregory A. Heller
Attorney, Agent, or Firm—Curtis, Morris & Safford

[57] ABSTRACT

In the process for the production of oxygen by adsorption, the following combination of steps are used: the number of adsorbers is at least three; the time of pumping y under sub-atmospheric pressure during step b) is higher than dephasing T/n, and at least equal to the time x of the production step; the phase of pumping of the column of adsorbent material is carried out by using on said adsorption column successively at least two systems of pumping wherein one is in operation from the start of the pumping operation, another one is adapted to operate until pumping is over.

24 Claims, 4 Drawing Sheets

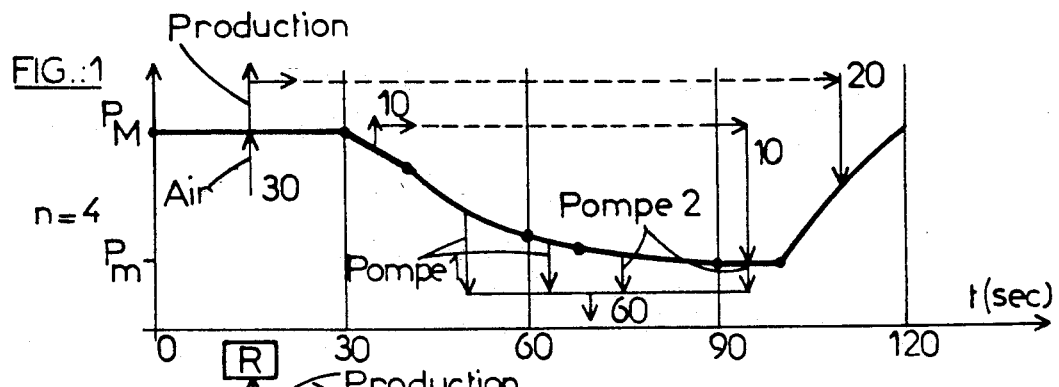
FIG.:1
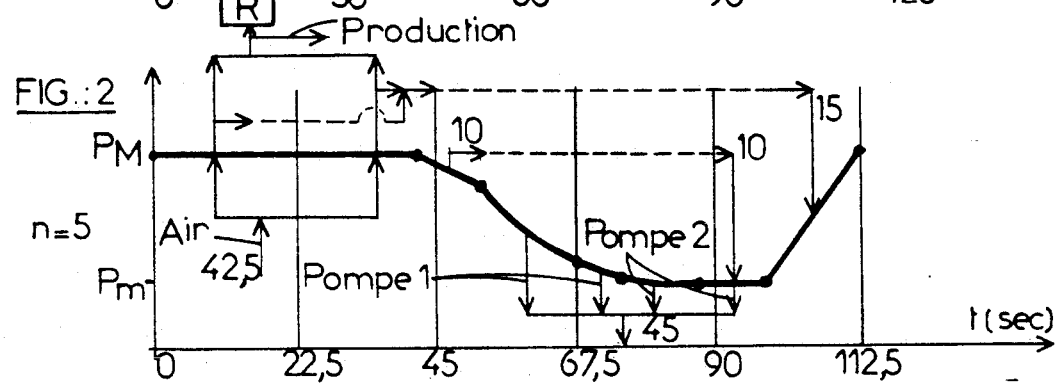
FIG.:2
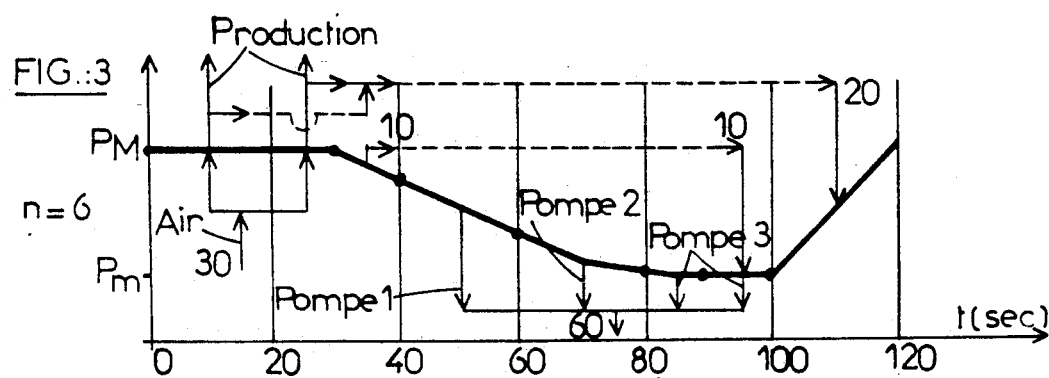
FIG.:3
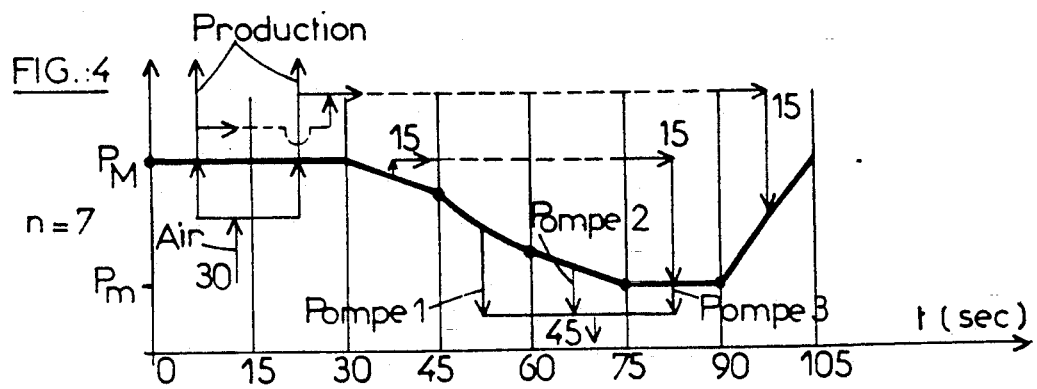
FIG.:4

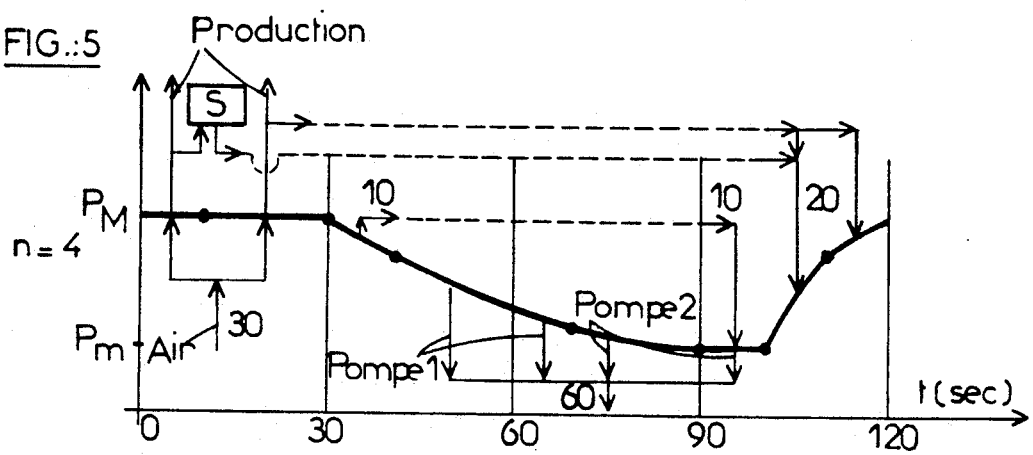
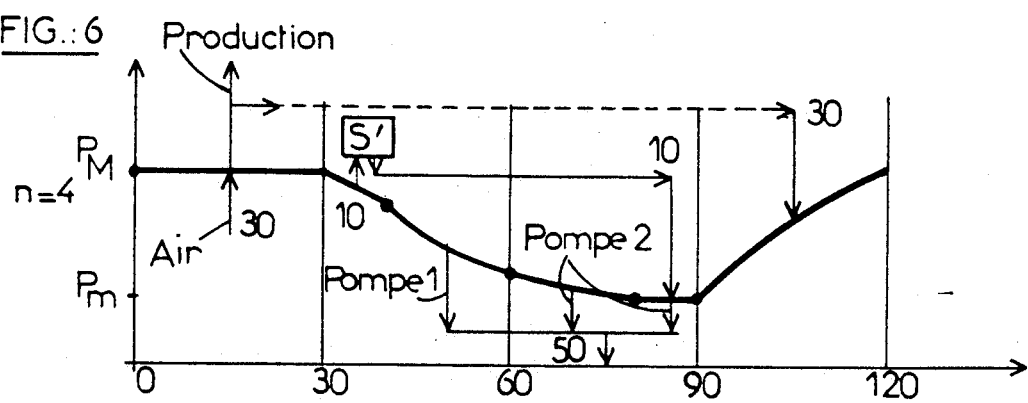
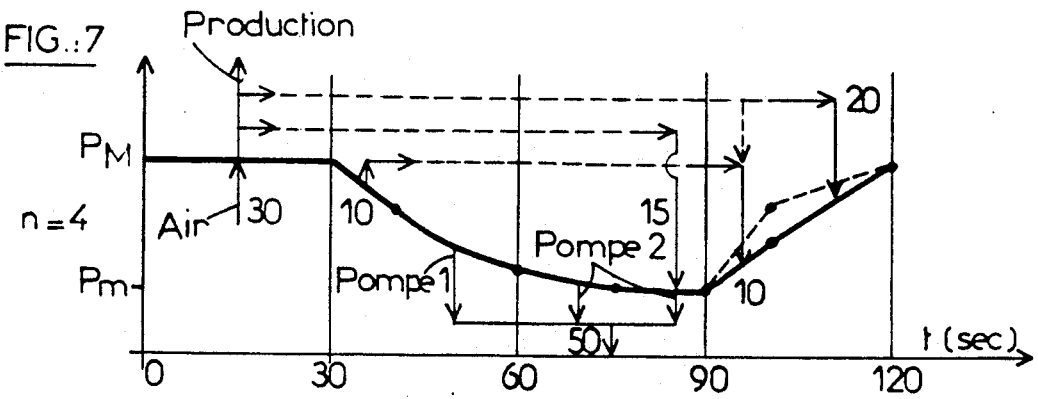

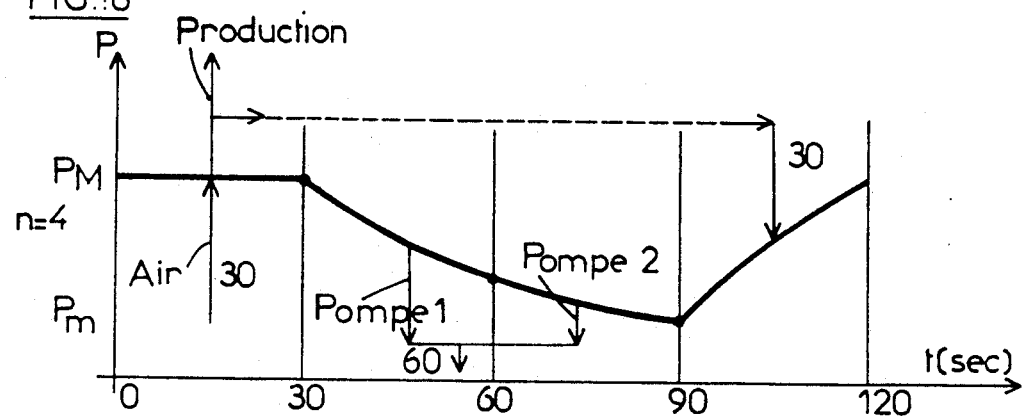
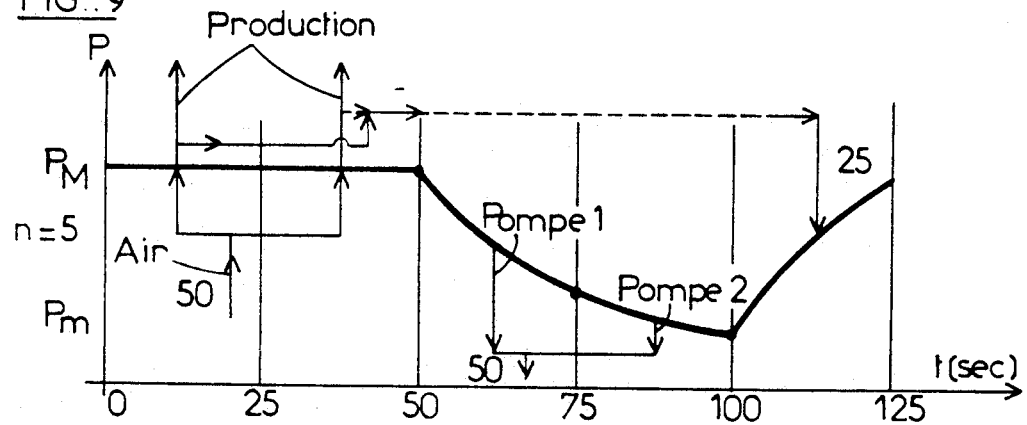
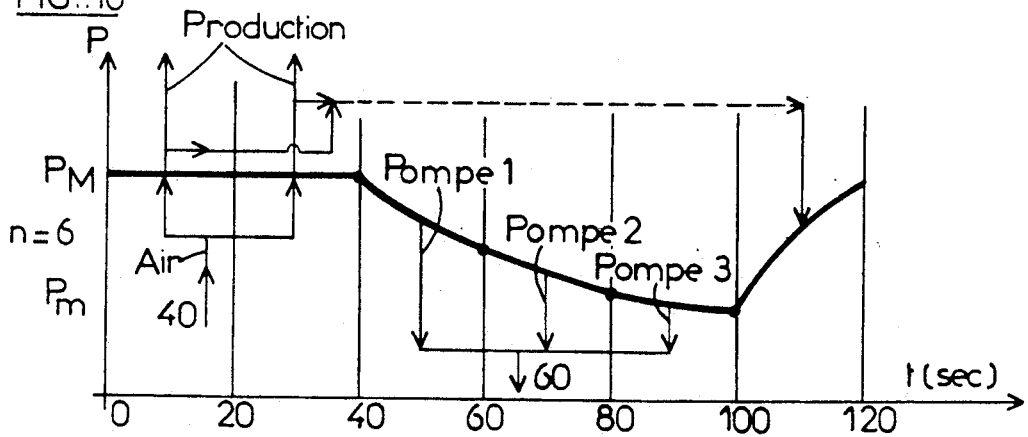

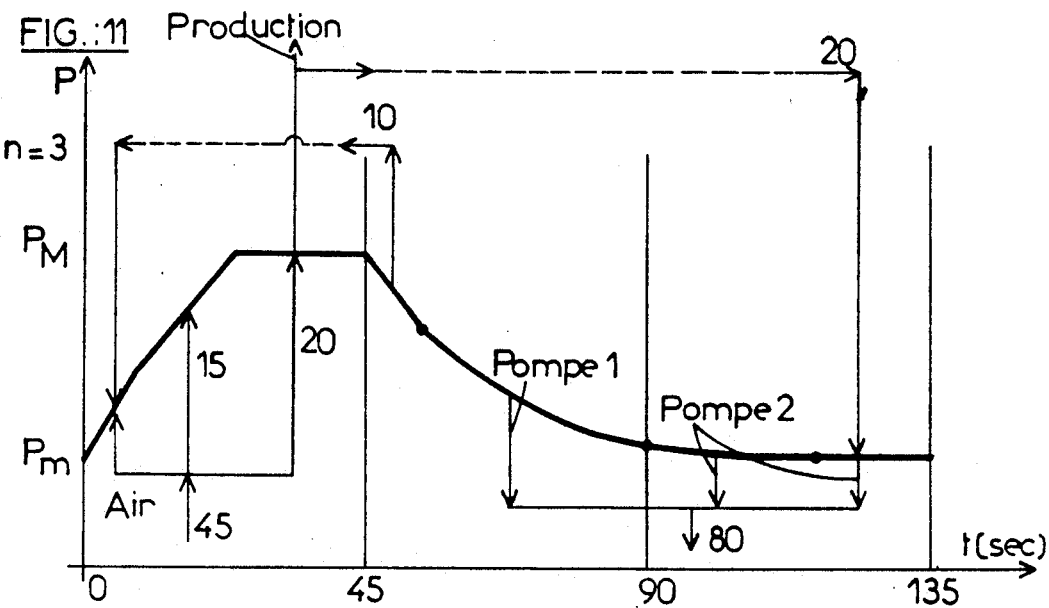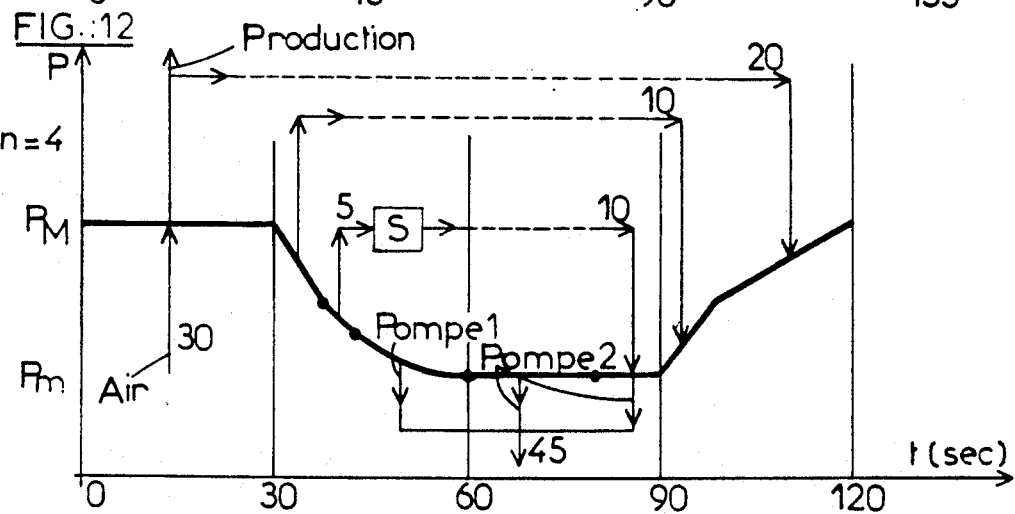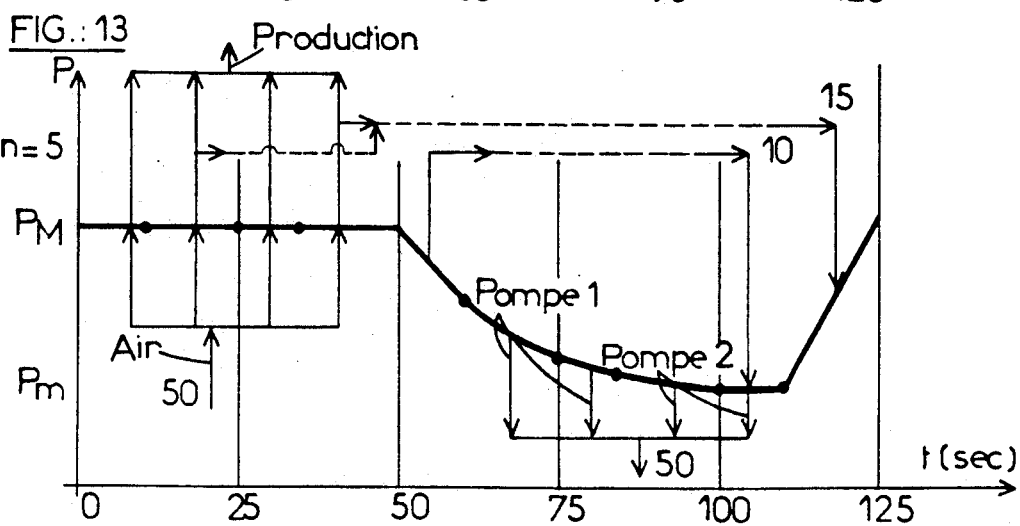

METHOD OF PRODUCING OXYGEN BY ADSORPTION

BACKGROUND OF INVENTION (a) Field of the Invention

The present invention concerns the production of oxygen by adsorption of nitrogen from air, of the type where, on a plurality n of columns of adsorbent material, there are successively provided in a cyclical manner on one of said columns with time lag T/n from one column to the next one, T being the period of the cycle;

a) a step of production of oxygen of duration x by gas withdrawal in a so called co-current direction, from a column of adsorbent material of the zeolite type, under high pressure comprising a maximum cycle pressure PM, with at least partial air admission during this step;

b) a step of pumping of duration y in counter-current under sub-atmospheric pressure, to provide a pressure reduction, which pumping is continued possibly, during flushing by counter-current passage of oxygen enriched gas, the minimum cycle pressure reached during said step being Pm;

c) a step of repressurization incorporrating at the latest before the step of pumping, at least one phase of counter-current repressurization with oxygen enriched gas.

(b) Description of Prior Art

This procedure, intended for the industrial production of oxygen by fractionating air over zeolites, for example of the 5A or 13X type, gives oxygen enriched air with oxygen content up to 95%, the residual 5% essentially consisting of argon.

In a large number of applications, a production quality with a 90/93% oxygen content is sufficient. In this range of contents, the quantities of oxygen required by the application may range from a few tons/day to hundred of tons/day.

The process mentioned above was developped in the range of 10 to 50 T/day of oxygen, and it has shown to be very competitive cost wise with respect to the oxygen obtained by cryogenic means and supplied in liquid form, or by piping.

The different types of cycles proposed for the production of oxygen generally comprise from two to four adsorbers only one adsorber being in production, while the other (or the others) are either being regenerated, or in intermediate phase (recycling, repressurization ...).

Since the cycles have a duration which generally varies between 90 seconds and a few minutes, the size of the adsorbers for a given cycle of a predetermined duration, and with the same type of adsorbent material, increases in proportion to the flow to be produced. The compliance with the rules governing the speed of passage of the gas during certain phases requires a minimum section for the flow of gas which, for large sizes, directly or indirectly becomes a limiting factor. In the case of vertical cylindrical adsorbers and with vertical circulation of gas, the diameter of the adsorbers becomes excessive beyond a certain size of the apparatus (limitation of the diameters of the bottoms and sleeves, problems of transportation, etc ...).

In the case of horizontal cylindrical adsorbers with vertical circulation of gas, which enable to carry higher flows than in the preceding case, with the same diameter, the fact of passing large flows causes problems of gas distribution in the internal collectors on both sides of the adsorbent material, as well as an important increase of the dead volume in these collectors. Thus, it is believed that such a unit is limited to about 60 T/day.

In the case where the application requires more important quantities of over-oxygenated air and oxygen, for example 300 T/day, the actual solution is, either to install a plurality of units mounted in parallel (for example 3 units of 50 T/day each for a demand of 150 T/day), or use the solution with cryogenic means.

The aim of the present invention is to exceed the actual tonnage limits of oxygen produced per production unit. More specifically, the object is to produce, with a single unit, a quantity of oxygen which could be much higher than 60 T/day, which in the production cost, would decrease the portion of fixed expenses (civil engineering, engineering in general, installation, starting). Another object of the invention is to increase the productivity so as to still reduce the production cost as compared to the utilization of a plurality of production units, the increase of productivity representing a decrease of the investment (material, adsorbent material ...). Still another object of the invention is to reduce the energy consumption which will still reduce the cost for the production of oxygen.

SUMMARY OF THE INVENTION

These objects of the invention are achieved by utilizing the following operating steps taken in global combination:

d) the number of adsorbers is at least three;

e) the maximum speed of the gas passing through an adsorption column is lower than the speed of attrition of the adsorbent material at any moment of the cycle, and is near said limit during at least one of the steps of the cycle;

f) the time of pumping y under sub-atmospheric pressure during step b) is higher than the dephasing T/n, and is at least equal to the time x of the production steps;

g) the phase of pumping the column of adsorbent material is carried out by successively using with said adsorption column at least two systems of pumping, one operating from the start of the pumping operation, the other one being adapted to operate until the end of the pumping operation.

The term speed of attrition means a gas speed, in an adsorption column beyond which the particles of adsorbent material are put in motion. The term system of pumping means either a pump or a motor therefor, or a pump stage or body and in this case, a plurality of systems of pumping may be connected to a single motor.

The invention is more particularly used with the following recommendations:

there is provided h) a depressurization between the step of production and the step of pumping, so as to supply a flushing gas for the possible step of flushing according to b) of another adsorber;

there is provided i) a co-current depressurization, between the step of production and the step of pumping so as to supply a partial repressurization gas for repressurization step c);

there is first provided the depressurization according to i) followed by the depressurization according to h);

the oxygen enriched gas of step b) and/or step c) is production oxygen;

the gas for co-current depressurization is at least partially introduced into a holding storage container, from which at least a portion of the flushing gas is withdrawn;

the phase of counter-current repressurization according to c) is carried out with production gas;

the production gas is stored in a buffer container from at least a portion of which the counter-current repressurization gas is withdrawn according to c);

the production step is carried out at least in part at maximum pressure;

the production step is carried out at least in part at increasing pressure;

the step of production is carried out at least in part under decreasing pressure;

the step of repressurization c) includes at least a phase of co-current repressurization with air;

the maximum cycle pressure PM is between $1 \times 10^5$ and $1.6 \times 10^5$ Pascal, while the minimum cycle pressure is between $0.2 \times 10^5$ and $0.5 \times 10^5$ Pascal;

the time of pumping according to b) is equal to a whole multiple of T/n;

the number of adsorbers "n" is four;

the step of pumping is carried with two pumping systems for a time which is twice that of the production step which is T/n;

the number of adsorbers is five, the duration of step of pumping is the same as the step of production which is 2T/5; the number of adsorbers in simultaneous production being two at any moment of the cycle;

the number of adsorbers is six or seven, the number of systems of pumping is three when it is in operation for a duration of 3T/n, while two adsorbers are in simultaneous production for a duration of 2T/n and this for the entire cycle.

By comparing the cycle of the invention with a known related cycle (same steps with adsorbers filled with the same adsorbent material, but in lower number), it has been observed that "production" increases (tons/day) by at least 50% and up to 300% and productivity increases ($Nm^3/h/m^3$ adsorbent material) by at least 10% and more generally from 12% to 20% depending on the various optional steps mentioned above.

It is by increasing the number of adsorbers as compared to the known related cycle, while preserving a cycle time which is substantially close thereto, that it is possible to increase production per unit.

It is by increasing the number of adsorbers as compared to the known related cycle, that it is possible to better optimize the times of the phases or steps, while respecting their own limits, which leads to a more performing cycle, and for example which is more productive.

It is by increasing the number of adsorbers as compared to the known related cycle by multiplying the number of adsorbers which are in simultaneous pumping operation, that it is possible to utilize a plurality of pumping systems, each of them being adapted to the specific range of pressures for which it is used.

BRIEF DESCRIPTION OF DRAWINGS

The invention is now illustrated with reference to the annexed drawings in which FIGS. 1 to 13 represent the diagrams of pressure (ordinate)-time (abscissa) of thirteen variants of operation, the pressure varying between maximum cycle pressure PM (between $1 \times 10^5$ and $1.6 \times 10^5$ Pascal) and a minimum cycle pressure Pm (between $0.2 \times 10^5$ and $0.5 \times 10^5$ Pascal).

DESCRIPTION OF PREFERRED EMBODIMENTS

In all the variants of FIGS. 1 to 10 and 12 to 13, the pressure-time (t) diagram is set at time 0 upon the start of the phase of oxygen production (passage of air in the adsorption column in the direction of the so called co-current circulation conventionally represented by an arrow in the direction of the ordinate oriented towards increasing ordinates), while a counter-current circulation, which is the reverse of the production step, i.e. from the "outlet" of the oxygen produced towards the "inlet" of the air to be fractionated, is represented by an arrow in the direction of the ordinate oriented towards the decreasing ordinates.

The different arrows are connected either at the free end, towards the increasing ordinates to indicate a flow of production oxygen, or oxygen enriched air, or are oriented towards the decreasing ordinates to indicate a pumping under sub-atmospheric pressure.

The durations of the various steps are noted inside circles and the duration of the cycle T is the longest time indicated in abscissa.

Having explained the above, details will now be given of the different cycles illustrating the invention, which include certain phases or steps among which, a step of production, a phase of first depressurization, a phase of second depressurization, a step of pumping possibly including a phase of flushing and a step of repressurization. The step of pumping is carried out by utilizing a plurality of systems of pumping pump 1, pump 2, etc. . . .

The times indicated in the following description are given by way of example, and are substantially adapted to the use of adsorbent material of average granulometry (balls whose average diameter is about 2 mm or cylindrical rods of 1.6 mm diameter).

| FIG. 1 | |
| --- | --- |
| Duration of cycle T | 120 sec. |
| Number of adsorbers n | 4 |
| Adsorber in production | 1 |
| Duration of production step | 30 sec. |
| Duration of first depressurization | 10 sec. |
| Duration of pumping | 60 sec. |
| Duration of flushing | 10 sec. |
| Pumping systems | two |
| Duration of repressurization | 20 sec. |
| FIG. 2 | |
| Duration of cycle T | 112.5 sec. |
| Number of adsorbers n | 5 |
| Adsorbers in production | 2 |
| Duration of production step | 42.5 sec. |
| Duration of first depressurization | 10 sec. |
| Duration of pumping | 45 sec. |
| Duration of flushing | 10 sec. |
| Systems of pumping | two |
| Duration of repressurization | 15 sec. |

It will be noted that there is a buffer container R on the production gas to control the effective production flow and to complete to the best the final repressurization.

| FIG. 3 | |
| --- | --- |
| Duration of cycle T | 120 sec. |
| Number of adsorbers n | 6 |
| Adsorbers in production | 1.5 |
| Duration of production step | 30 sec. |
| Duration of first depressurization | 10 sec. |

-continued

| | | |
|---|---|---|
| Duration of pumping | 60 sec. | |
| Duration of flushing | 10 sec. | |
| Systems of pumping | three | |
| Duration of repressurization | 20 sec. | |
| FIG. 4 | | |
| Duration of cycle T | 105 sec. | |
| Number of adsorbers n | 7 | |
| Adsorbers in production | 2 | |
| Duration of production step | 30 sec. | |
| Duration of first depressurization | 15 sec. | |
| Duration of pumping | 45 sec. | |
| Duration of flushing | 15 sec. | |
| Systems of pumping | three | |
| Duration of repressurization | 15 sec. | |
| FIG. 5 | | |
| Duration of cycle T | 120 sec. | |
| Number of adsorbers n | 4 | |
| Adsorber in production | 1 | |
| Duration of production step | 30 sec. | |
| Duration of first depressurization | 10 sec. | |
| Duration of pumping | 60 sec. | |
| Duration of flushing | 10 sec. | |
| Systems of Pumping | two | |
| Duration of repressurization | 20 sec. | |

It will be noted that there is a holding container S for a shorter repressurization than the production step, so as to equalize the useful production flow.

| | | |
|---|---|---|
| FIG. 6 | | |
| Duration of cycle T | 120 sec. | |
| Number of adsorbers n | 4 | |
| Adsorber in production | 1 | |
| Duration of production step | 30 sec. | |
| Duration of first depressurization | 10 sec. | |
| Duration of pumping | 50 sec. | |
| Duration of flushing | 10 sec. | |
| Systems of pumping | two | |
| Duration of repressurization | 30 sec. | |

It will be noted that there is a storage container S' which enables to postpone the utilisation for flushing of the gas from the first depressurization, when this first depressurization does not coincide in time with said flushing from another adsorber.

| | | |
|---|---|---|
| FIG. 7 | | |
| Duration of cycle T | 120 sec. | |
| Number of adsorbers n | 4 | |
| Adsorber in production | 1 | |
| Duration of production step | 30 sec. | |
| Duration of first depressurization | 10 sec. | |
| Duration of pumping | 50 sec. | |
| Duration of flushing | 15 sec. | |
| Systems of pumping | two | |
| Duration of repressurization | 30 sec. | |

It will be noted that the first depressurization is first used for repressurizing another adsorber while the flushing gas is a withdrawn flow, during half of the production step, from the oxygen produced. The dotted lines represent a variant of first repressurization according to which in addition to the gas from the adsorber in the first depressurization, a production gas is added.

| | | |
|---|---|---|
| FIG. 8 | | |
| Duration of cycle T | 120 sec. | |
| Number of adsorbers n | 4 | |
| Adsorber in production | 1 | |
| Duration of production step | 30 sec. | |
| Duration of pumping | 60 sec. | |

-continued

| | | |
|---|---|---|
| Systems of pumping | two | |
| Duration of repressurization | 30 sec. | |
| FIG. 9 | | |
| Duration of cycle T | 125 sec. | |
| Number of adsorbers n | 5 | |
| Adsorbers in production | 2 | |
| Duration of production step | 50 sec. | |
| Duration of pumping | 50 sec. | |
| Systems of pumping | two | |
| Duration of repressurization | 25 sec. | |
| FIG. 10 | | |
| Duration of cycle T | 120 sec. | |
| Number of adsorbers n | 6 | |
| Adsorbers in production | 2 | |
| Duration of production step | 40 sec. | |
| Duration of pumping | 60 sec. | |
| Systems of pumping | three | |
| Duration of repressurization | 20 sec. | |
| FIG. 11 | | |
| Duration of cycle T | 135 sec. | |
| Number of adsorbers n | 3 | |
| Adsorbers in production | 1 part time | |
| Duration of production step | 20 sec. | |
| Duration of first depressurization | 10 sec. | |
| Duration of pumping | 80 sec. | |
| Systems of pumping | two | |
| Duration of repressurization | | |
| air + enriched air | 10 sec. | |
| air alone | 15 sec. | |
| FIG. 12 | | |
| Duration of cycle T | 120 sec. | |
| Number of adsorbers n | 4 | |
| Adsorbers in production | 1 | |
| Duration of production step | 30 sec. | |
| Duration of first depressurization | 10 sec. | |
| Duration of second depressurization | 5 sec. | |
| Duration of pumping | 45 sec. | |
| Duration of flushing | 10 sec. | |
| Systems of pumping | two | |
| Duration of repressurization | 30 sec. | |
| FIG. 13 | | |
| Duration of cycle T | 125 sec. | |
| Number of adsorbers n | 5 | |
| Adsorbers in production | 2 | |
| Duration of production step | 50 sec. | |
| Duration of first depressurization | 10 sec. | |
| Duration of pumping | 50 sec. | |
| Duration of flushing | 10 sec. | |
| Systems of pumping | two | |
| Duration of repressurization | 15 | |

We claim:

1. A process for the production of a gas having a substantial content of oxygen by adsorptive separation from air in an adsorption apparatus having n adsorber columns, each column containing an adsorbent material exhibiting a speed of attrition, n being no less than 3, and comprising the following sequential steps, occurring over a cycle period T for each column, with a time lag of T/n from one column to another:

a) a production step in which air is fed cocurrently and production gas is withdrawn from a column, at least a portion of said production step being carried out at superatmospheric pressures which include a maximal pressure during said cycle;

b) a countercurrent pumping step to reduce pressure to a subatmospheric minimum pressure of said cycle, said pumping step having a duration not less than the production step and including at least two successive pumping sub-steps, each being performed with a respective pumping means;

c) a repressurization step which includes countercurrent feeding of said gas produced from another column; and wherein the maximum speed of gaseous medium through a column is kept lower than the attrition speed of the adsorbent in that column and approaches said attrition speed during that step in said cycle which exhibits minimum duration.

2. The process of claim 1, further comprising the step of co-current depressurization between the step of production and the step of pumping to supply a flushing gas for the flushing of another column during the pumping step of said other column.

3. The process of claim 2 additionally comprising a further co-current depressurization step between the production step and the pumping step to supply a partial repressurization gas for the repressurization step of another column.

4. The process of claim 3 wherein the depressurization step which supplies flushing gas follows the depressurization step which supplies partial repressurization gas.

5. The process of claim 2, wherein the co-current depressurization step at least partially introduces gas into a holding storage container, from which at least a portion of the flushing gas is withdrawn.

6. The process of claim 1 further comprising buffer storage of production gas from which at least a portion of the gas for counter-current repressurization is withdrawn.

7. The process of claim 1 wherein the production step is carried out at least partially at maximum pressure.

8. The process of claim 1 wherein the production step is carried out at least partially at an increasing pressure.

9. The process of claim 1 wherein the production step is carried out at least partially at a decreasing pressure.

10. The process of claim 1 wherein the step of repressurization includes at least a phase of co-current repressurization with air.

11. The process of claim 1 wherein the maximal pressure of said cycle is between $1 \times 10^5$ and $1.6 \times 10^5$ Pascal, and the minimum pressure of said cycle is between $0.2 \times 10^5$ and $0.5 \times 10^5$ Pascal.

12. The process of claim 1 wherein the countercurrent pumping step is carried out for a duration equal to a whole multiple of $T/n$.

13. The process of claim 1 wherein "n" is four.

14. The process of claim 13, wherein the two successive pumping steps are carried out for a duration which is twice that of the production step.

15. The process of claim 1 wherein the number of adsorber columns is five, the countercurrent pumping step has the same duration as the production step which is $2T/5$, and the number of adsorber columns in simultaneous production at any moment of the cycle period is two.

16. The process of claim 1 wherein the number of adsorber columns is six, the number of respective pumping means is three which operate for a total duration of $3T/n$, the number of adsorber columns in simultaneous production at any moment of the cycle is two and the duration of the production step is $2T/n$.

17. The process of claim 1, wherein the production step has a duration not less than $0.25\ T$.

18. The process of claim 17, wherein the production step has a duration not less than $T/3$.

19. The process of claim 17, wherein the pumping step has a duration equal to that of the production step.

20. The process of claim 1, wherein $n=5$, and wherein the production step and the pumping step have the same duration.

21. The process of claim 20, wherein the repressurization step has a duration not greater than $T/5$.

22. The process of claim 21, further including an intermediate co-current depressurization step between the production step and the pumping step, and wherein the repressurization step has a duration less than $T/5$.

23. The process of claim 1 wherein the production gas is production oxygen.

24. The process of claim 1 wherein the number of adsorber columns is seven, the number of respective pumping means is three which operate for a total duration of $3T/n$, the number of adsorber columns in simultaneous production at any moment of the cycle is two and the duration of the production step is $2T/n$.

* * * * *